United States Patent [19]

Nishida et al.

[11] Patent Number: 4,998,283
[45] Date of Patent: Mar. 5, 1991

[54] SCREEN DEVICE

[75] Inventors: Tsutomu Nishida, Ibaraki; Kazumi Kawashima, Takatsuki; Kazuyasu Yamamoto, Minoo; Naoki Shintani, Ibaraki; Naoji Okumura, Ibaraki; Yasuaki Sakanishi, Ibaraki, all of Japan

[73] Assignee: Matsushita Electric Industrial Co., Ltd., Osaka, Japan

[21] Appl. No.: 555,356

[22] Filed: Jul. 17, 1990

Related U.S. Application Data

[63] Continuation of Ser. No. 285,414, Dec. 16, 1988, abandoned.

[30] Foreign Application Priority Data

Dec. 21, 1987 [JP] Japan ............................... 62-323101
Dec. 29, 1987 [JP] Japan ............................... 62-334528
Dec. 29, 1987 [JP] Japan ............................... 62-334533
Dec. 29, 1987 [JP] Japan ............................... 62-334550

[51] Int. Cl.[5] .............................................. H04R 1/02
[52] U.S. Cl. ...................................... 381/90; 381/152; 381/188; 381/205; 352/11; 181/161
[58] Field of Search ................... 181/141, 161; 352/11; 381/152, 191, 188, 205; 358/60

[56] References Cited

U.S. PATENT DOCUMENTS

| 1,778,084 | 10/1930 | Nevin ............................ 381/152 |
| 1,955,682 | 4/1934 | Newman et al. ................. 381/152 |
| 1,997,815 | 4/1935 | Edelman .......................... 352/11 |
| 2,438,256 | 3/1948 | Stein . | |
| 3,086,078 | 4/1968 | Sharma . | |
| 3,567,847 | 3/1971 | Price ............................. 358/60 |
| 3,569,988 | 3/1971 | Schmidt et al. ................. 358/60 |
| 3,992,585 | 11/1976 | Turner et al. ................... 381/191 |
| 4,385,210 | 5/1983 | Marquiss ......................... 181/150 |
| 4,410,761 | 10/1983 | Schickedanz .................... 381/24 |

FOREIGN PATENT DOCUMENTS

| 3127478 | 1/1983 | Fed. Rep. of Germany . |
| 924512 | 8/1947 | France . |
| 5674589 | 11/1954 | Japan . |
| 56-137573 | 10/1981 | Japan . |
| 58-66782 | 6/1983 | Japan . |
| 59-201600 | 11/1984 | Japan . |
| 321043 | 10/1929 | United Kingdom . |
| 978781 | 12/1964 | United Kingdom . |

OTHER PUBLICATIONS

"Mit Stereoton", Fernsehgerate-Bildplatte, Funkausstellung '81, pp. 60–63.
"A Triphonic Sound System for Television Broadcasting", Emil Torick, SMPTE Journal, Aug. 1983, pp. 843–848.
NHK Technical Report, 1986 11, vol. 29, pp. 417–420.

Primary Examiner—Forester W. Isen
Attorney, Agent, or Firm—Stevens, Davis, Miller & Mosher

[57] ABSTRACT

A screen device suited to use in a projection type display device for a high-definition television set. The screen device includes a screen on which television images are projected, and a screen frame to which this screen is attached at the central section thereof. Incorporated into this screen frame are speakers which are used as the front speakers of a sound reproduction system of the type which is commonly known as the 3-1 type 4-channel system.

2 Claims, 7 Drawing Sheets

SCREEN DEVICE

This application is a continuation of application Ser. No. 285,414, filed Dec. 16, 1988, now abandoned.

BACKGROUND OF THE INVENTION

This invention relates to a screen device best suited to use in a projection type display device for a high-definition television (HDTV) set.

Nowadays, high-definition television sets which can provide more impact and realism in feeling than conventional television sets are being rapidly developed. Such high-definition television sets incorporate an audio system having three front channels and one rear channel (hereinafter referred to as 3-1 type 4-channel system) (e.g. "NHK TECHNICAL REPORT", 1986 11, VOL. 29, pp. 417-420).

An example of such a system is shown in FIG. 1. This system includes a front-left channel speaker 2 arranged forward on the left (of a viewer 1), a front-central channel speaker 3 arranged forward at the center, a front-right channel speaker 4 arranged forward on the right, a rear-left channel speaker 5 arranged rearward on the left, and a rear-right channel speaker 6 arranged rearward on the right. The two rearward arranged speakers reproduce the same sound.

FIGS. 2 and 3 are a front elevational view and a plan view, respectively, of the screen of a conventional high-resolution television set and the front speakers of the 3-1 type 4-channel speaker system used therewith. As shown in the drawings, this conventional high-definition television set includes a screen 7 having a front projection type display, a left side sound speaker 2, a center sound speaker 3 arranged behind the screen 7, and a right side sound speaker 4.

In this television set, television images are displayed on the screen 7, 3-channel front sound being reproduced through the speakers 2, 3 and 4 arranged behind and on the left and right of the screen 2. The reference numeral 8 indicates the frame of the screen 7.

With a television set with the above construction, since the center sound speaker 3 is arranged behind the screen 7, the screen operates as a barrier to the sound emanating from this speaker 3. Furthermore, in the case of a rear projection type display, the above-described speaker system cannot be adopted since the center speaker 3 arranged behind the screen stands in the way of rear projection. Moreover, when a larger screen is employed, the sound should be magnified accordingly so as to augment the impact and realism in feeling of the television system, resulting in large-sized speakers which occupy a relatively large floor area when installed.

It is accordingly an object of this invention to provide a screen device in which the above-mentioned problems are eliminated, i.e., a screen device in which the sound from the center speaker is not interfered by the screen and which can provide greater impact and realism in feeling even with a complete system including speakers that is reduced in size.

Another object of this invention is to provide a screen device which can be used in a rear projection type display.

The screen device in accordance with this invention is characterized in that the three kinds of front speakers are incorporated into the screen frame to which the screen is attached in the central section thereof.

Further, the screen device in accordance with this invention is characterized in that it includes, in addition to the speakers that are incorporated into the screen frame, speakers which utilize the screen itself as the diaphragm.

DETAILED DESCRIPTION OF THE PREFERRED EMBODIMENTS

Some embodiments of this invention will now be described.

Figure 1:
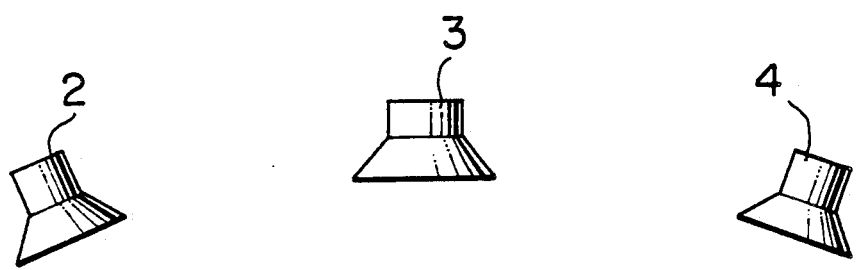
FIG. 1 is a plan view illustrating the principle of the 3-1 type 4-channel sound reproduction system.
Figure 1:
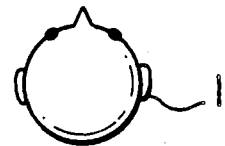
Figure 1:
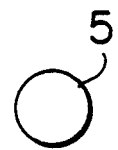
Figure 1:
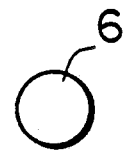
Figure 2:
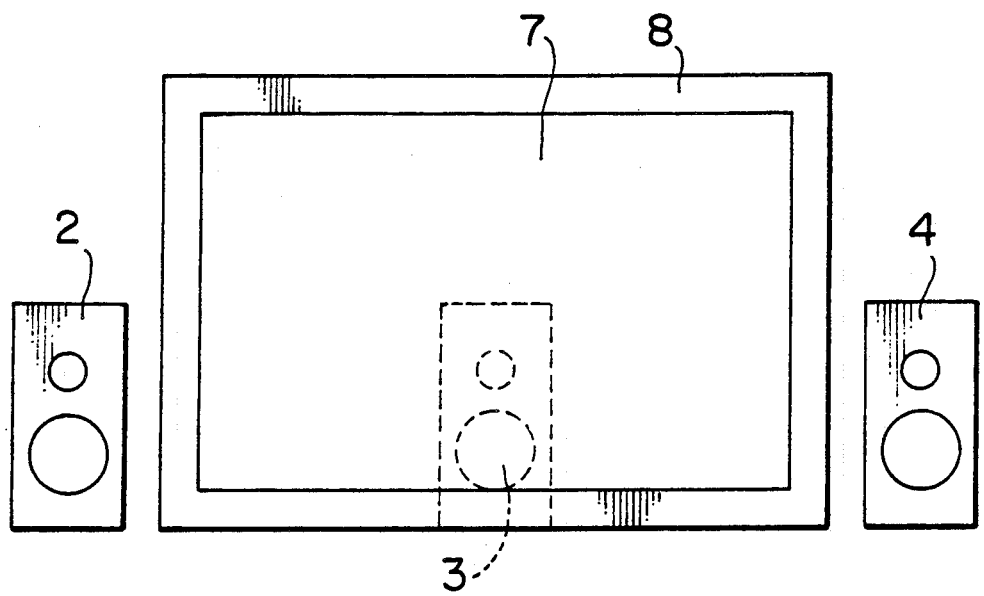
FIG. 2 is a front elevational view of a conventional arrangement of a screen and speakers.
Figure 3:
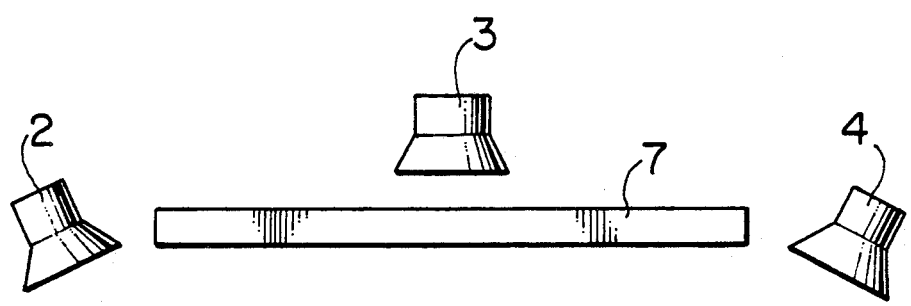
FIG. 3 is a plan view of the arrangement shown in FIG. 2.
Figure 4A:
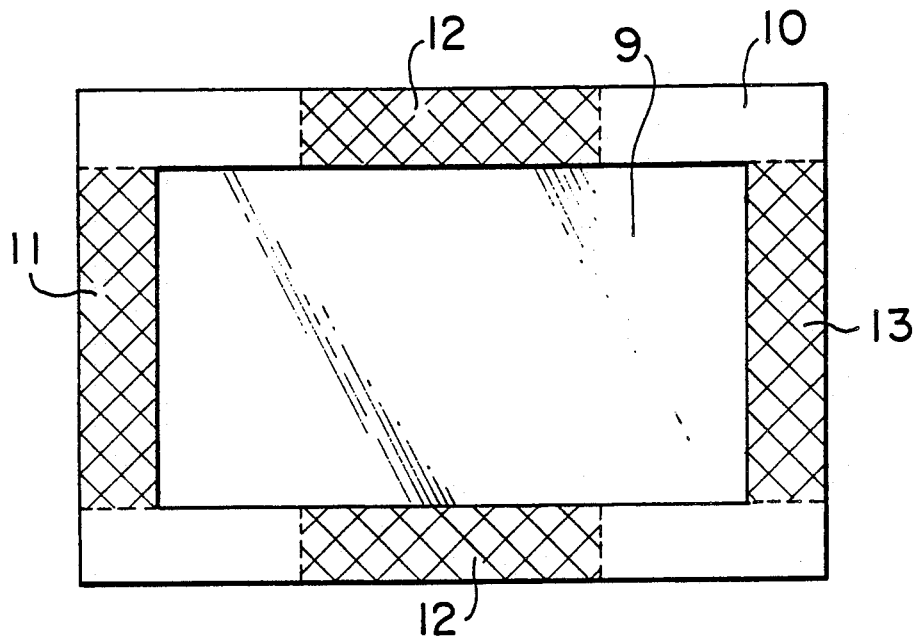
FIG. 4A is a front elevational view of a first embodiment of this invention.
Figure 4B:
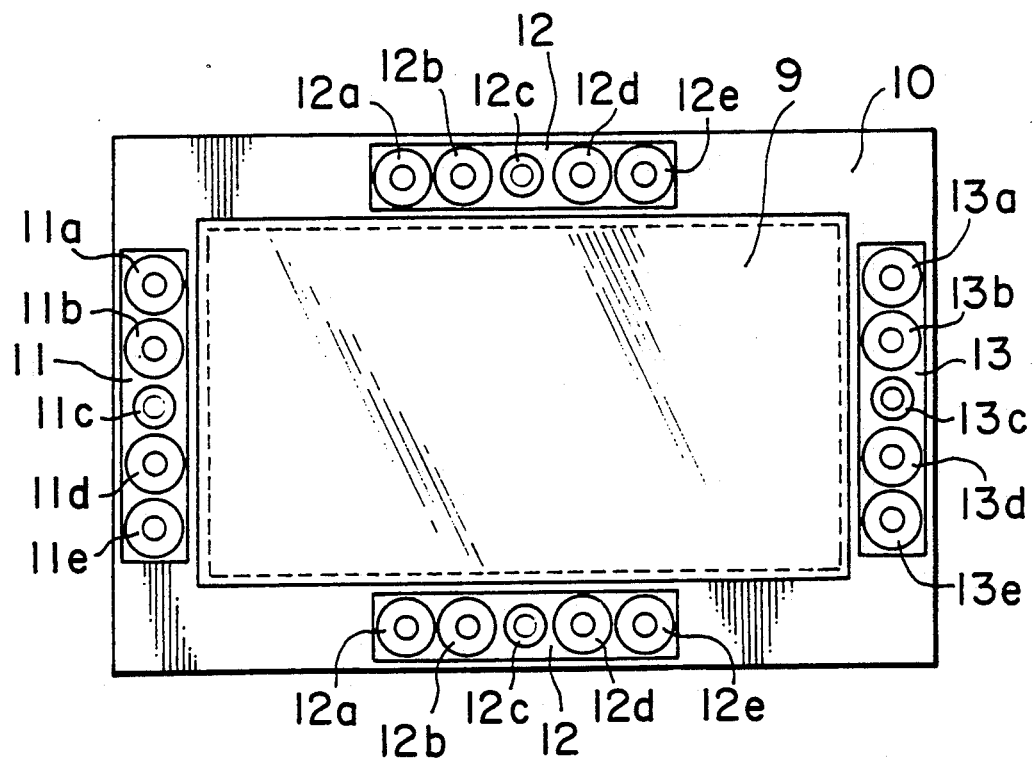
FIG. 4B is a detailed front elevational view of the same.
Figure 4C:
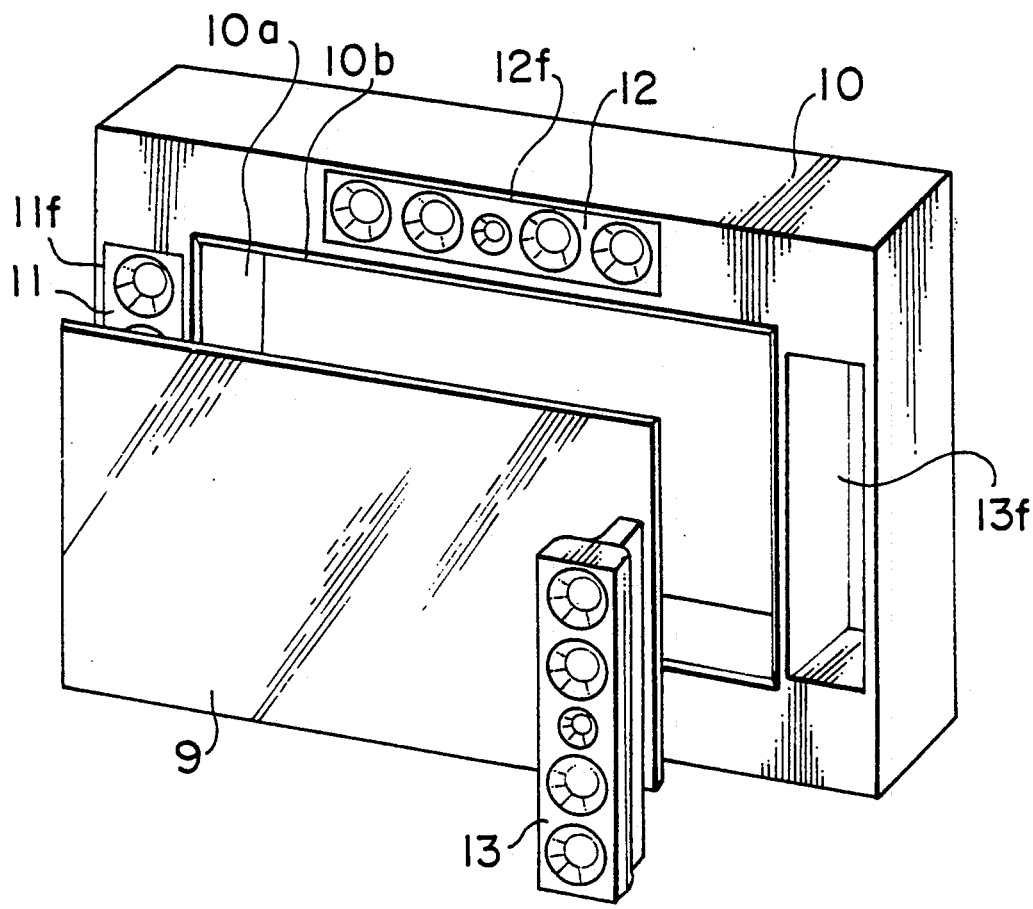
FIG. 4C is an exploded perspective view illustrating the mode of assembly of this embodiment.

FIG. 4A shows a first embodiment of this invention. As shown in FIG. 4A, a screen 9 on which high-definition television images are projected is attached to the central section of a screen frame 10. In order to provide a 3-1 type 4-channel sound reproduction system, a front-left channel speaker 11, front-central channel speakers 12 and a front-right channel speaker 13 are respectively incorporated into part of the left side section, the upper and lower middle sections, and the right middle section of the screen frame 10. As shown in FIG. 4B, the speakers 11, 12 and 13 are respectively composed of a plurality of speaker units 11a to 11e, 12a to 12e and 13a to 13e. FIG. 4C illustrates how this screen device is assembled. The screen 9 is fitted into a stepped section 10b provided in front of the central space section 10a of the screen frame 10c. The speakers 11, 12 and 13 are attached to the frame 10 by being fitted into respective attachment cavities provided respectively, in the left section, the upper and lower middle sections and the right section of the screen frame 10.

In the screen device shown in FIG. 4, the screen 9 does not interfere with the sound from the central channel speakers 12, so that the viewer can clearly hear it; thus the impact and realism in the feeling of the sound of the device are augmented. Further, since the speakers 11, 12 and 13 are incorporated into part of the screen frame 10, the entire device can be made to have a small overall size, and the space required for installation can be smaller than that for conventional screen devices even when the screen is designed to be comparatively large so as to augment the realism and the impact in the feeling of the sound of the device.

Unlike the conventional screen device described above, the screen device shown in FIG. 4 has no speaker arranged behind the screen, television images can be projected not only at the front but also from behind the screen. It can accordingly be applied to a rear projection type display.

The front-central channel speakers 12 need not necessarily be provided in both of upper and lower side sections of the screen frame. Either the upper or lower speakers may be omitted.

Figure 5:
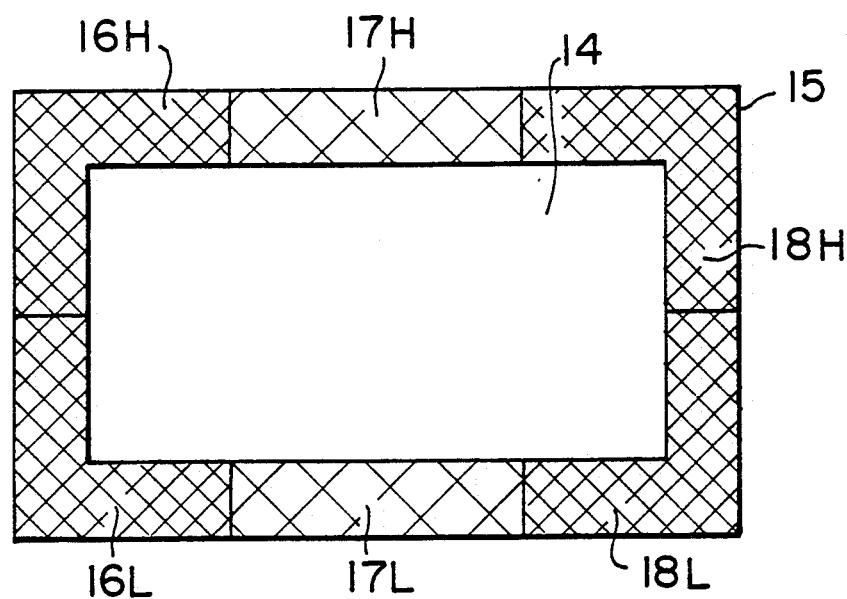
FIG. 5 is a front elevational view of a second embodiment of this invention.

FIG. 5 shows a second embodiment of this invention. In this embodiment, the following speakers are incorporated into a screen frame 15 in the same manner as in the embodiment of FIG. 4: a front-left channel tweeter 16H arranged in the upper left section (of the frame, the same applying to the following), a front-left woofer 16L arranged in the lower left section, a front-central channel tweeter 17H in the upper middle section, a front-central channel woofer 17L in the lower middle section, a front-right channel tweeter 18H in the upper right section, and a front-right channel woofer 18L in the lower right section.

Figure 6A:
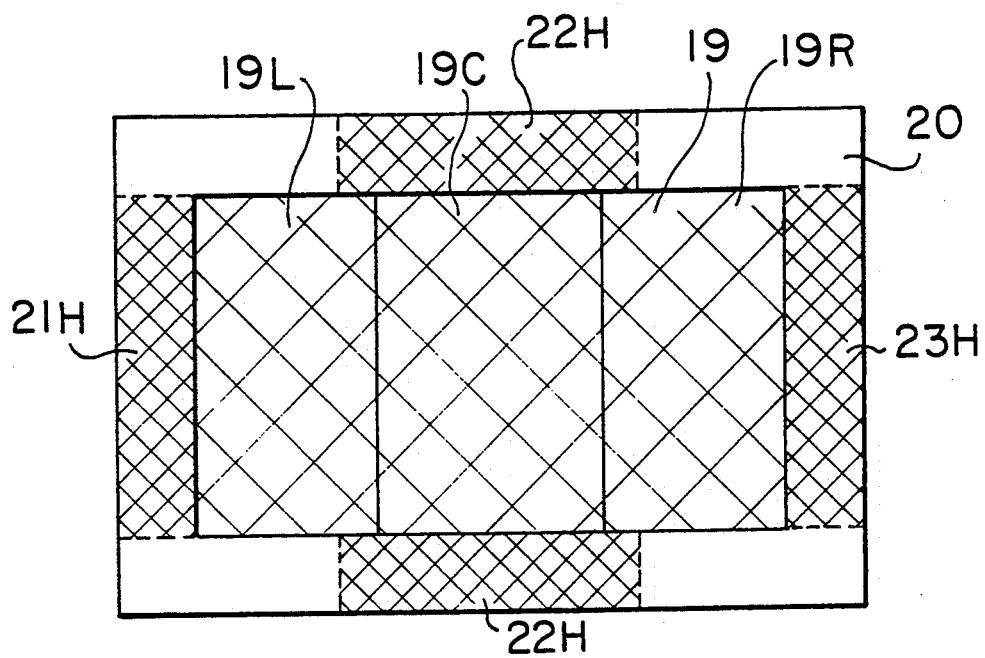
FIG. 6A is a front elevational view of a third embodiment of this invention.
Figure 6B:
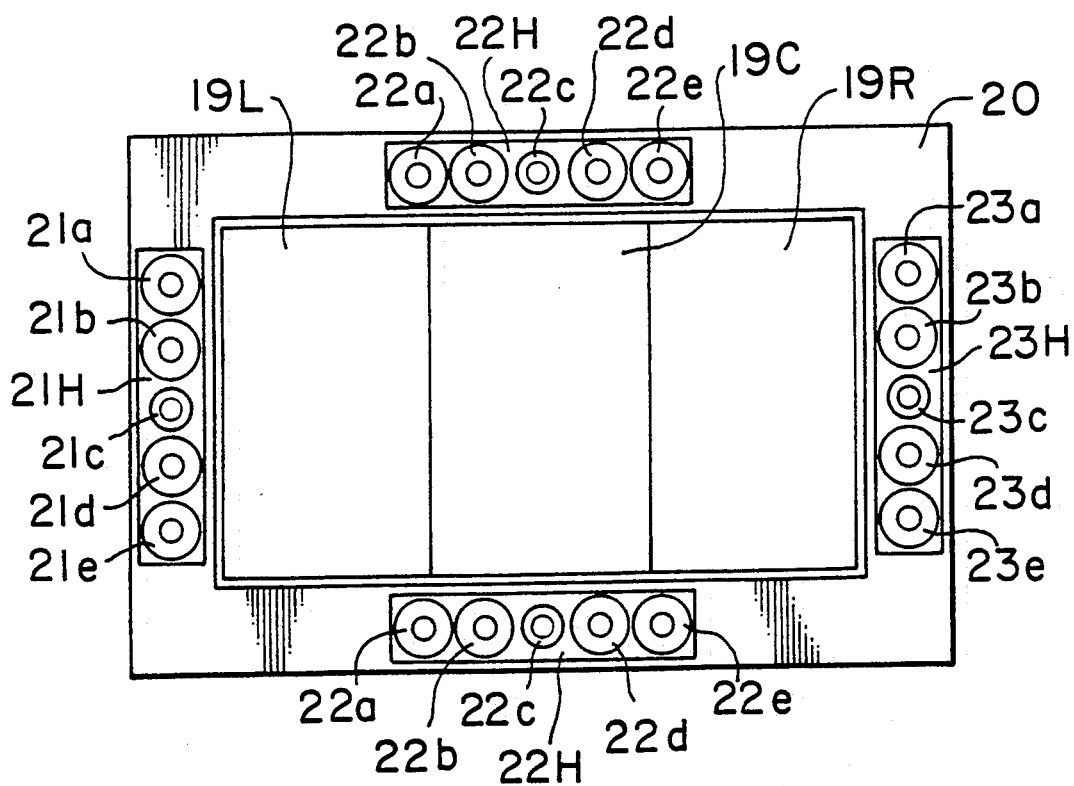
FIG. 6B is a detailed front elevational view of the same.
Figure 6C:
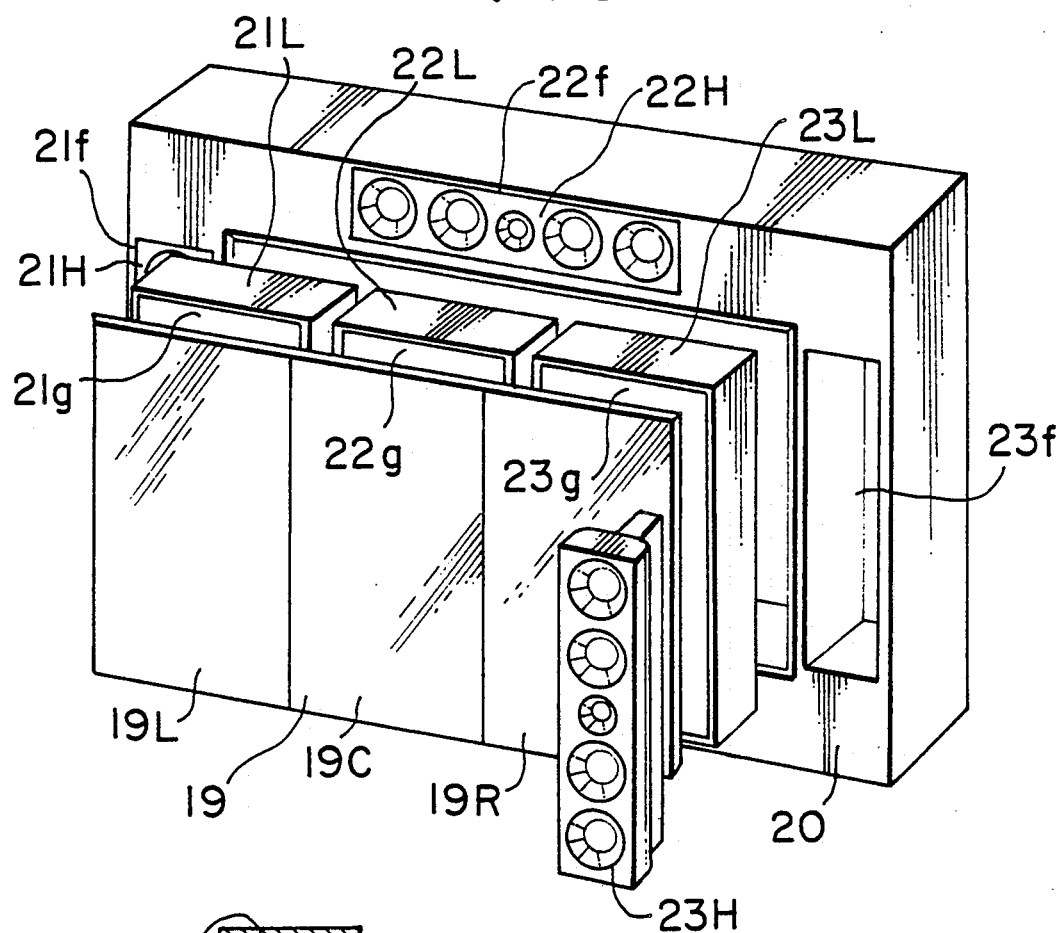
FIG. 6C is an exploded perspective view illustrating the mode of assembly of the same.
Figure 6D:
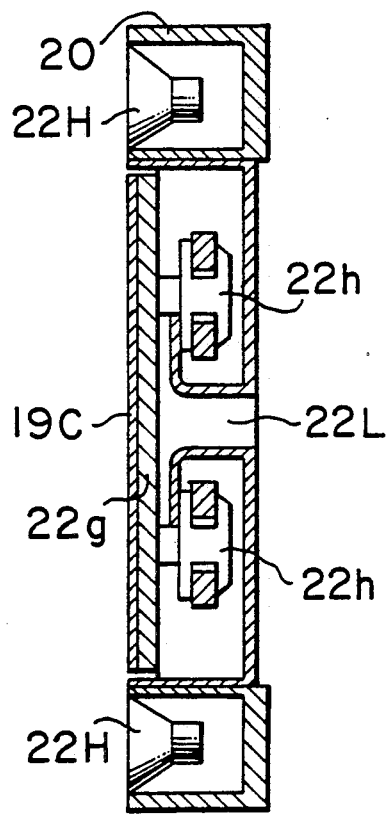
FIG. 6D is a side sectional view of the same.

FIG. 6A shows a third embodiment of this invention. As shown in FIG. 6A, a screen 19 on which high-definition television images are projected is attached to the central section of a screen frame 20. In order to provide a 3-1 type 4-channel sound reproduction system, this embodiment includes a front-left channel tweeter 21H, a front-central channel tweeter 22H and a front-right channel tweeter 23H respectively incorporated into parts of the left side section, the upper and lower middle sections and the right section, of the screen frame 20. As shown in FIG. 6B, the speakers 21H, 22H and 23H are respectively composed of a plurality of speaker units 21a to 21e, 22a to 22e, and 23a to 23e. FIGS. 6C and 6D illustrate how this screen device is assembled. The speakers 21H, 22H and 23H are fitted into respective attachment cavities 21f, 22f and 23f formed in the left section, the upper and lower middle sections and the right section, respectively of the frame 20.

Further, the screen 19 of this embodiment is divided into three portions, i.e., a left-side portion 19L, a middle portion 19C and a right-hand portion 19R. The left-hand portion 19L is stuck to the diaphragm 21g of the front-left channel woofer 21L to be united therewith. The middle portion 19C is stuck to the diaphragm 22g of the front-central channel woofer 22L to be united therewith. The right-hand portion 19R is stuck to the diaphragm 23g of the front-right woofer 23L to be united therewith. The reference numeral 22h indicates the drive unit of the speaker 22H.

Since in this embodiment the three portions 19L, 19C and 19R of the screen 19 are respectively united with the diaphragms 21g, 22g and 23g of the speakers 21L, 22L and 23L and oscillate as a part thereof to reproduce bass sounds, they are able to realize clear reproduction of bass sounds. In addition, since the portions composing the screen 19 are utilized for reproducing bass sound, the space for the woofers can be spared.

The woofers 21L, 22L and 23L may be of the so-called flat type speakers.

Figure 7:
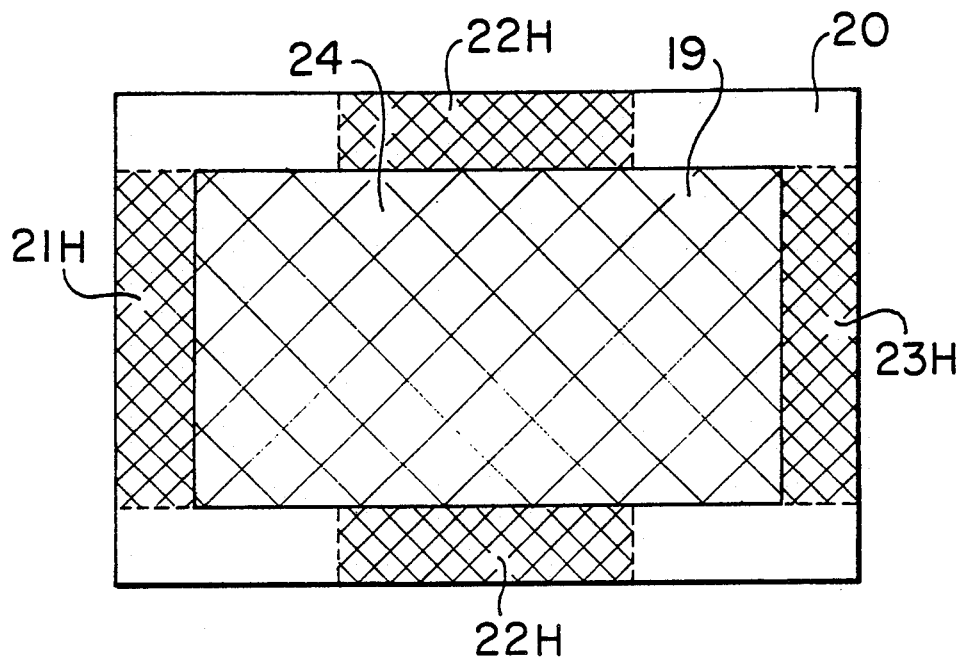
FIG. 7 is a front elevational view of a fourth embodiment of this invention.

FIG. 7 shows a fourth embodiment of this invention. In this embodiment, the entire screen 19 is stuck to the diaphragm of a single flat woofer 24 to be united therewith. Apart from this, the structure of this embodiment is the same as that of FIG. 6. Since bass sounds are dull in directivity, the speaker characteristics do not deteriorate very much even if only one woofer is provided, as shown in FIG. 7, instead of the three woofers shown in FIG. 6. In the embodiment shown in FIG. 7, a mixed bass sound is reproduced by driving the single woofer with a signal in which the bass sound signals for the front-left channel, the front-central channel and the front-right channel are mixed together.

Figure 8:
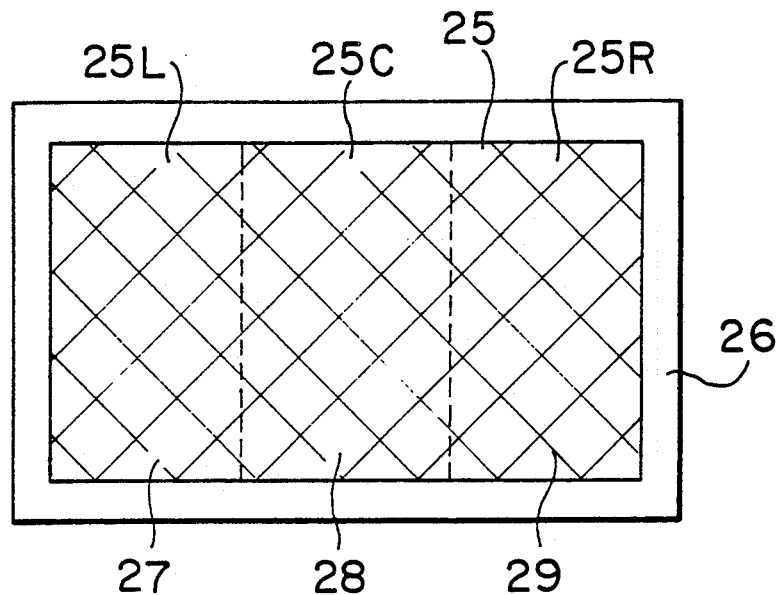
FIG. 8 is a front elevational view of a fifth embodiment of this invention.

FIG. 8 shows a fifth embodiment of this invention. In this embodiment, a screen 25 is provided in a screen frame 26. The screen 25 is divided into three portions, i.e., a left-hand portion 25L, a middle portion 25C and a right-hand portion 25R. The left-hand portion 25L is stuck to the diaphragm of a front-left channel speaker 27 to be united therewith. The middle portion 25C is stuck to the diaphragm of a front-central channel speaker 28 to be united therewith. The right-hand portion 25R is stuck to the diaphragm of a front-right channel speaker 29 to be united therewith. The speakers used in this embodiment are adapted to reproduce the sounds of the entire band width.

What is claimed is:

1. A screen apparatus, comprising:
   a screen onto which images are to be projected, said screen being divided into three vertical sections, respectively left side, center and right side sections;
   a screen frame surrounding and supporting said screen so as to allow said screen to oscillate independently of said screen frame, said screen frame having a left side part, center upper and lower parts, and a right side part;
   a group of speakers including at least one front-left channel tweeter, at least one front-center channel tweeter, at least one front-right channel tweeter, at least one front-left channel flat-type woofer having a diaphragm, a front-center channel flat-type woofer having a diaphragm and a front-right channel flat-type woofer having a diaphragm, said front-left channel tweeter being incorporated in said left side part of said screen frame, said front-center channel tweeter being incorporated in one of said center upper or lower parts of said screen frame, said front-right channel tweeter being incorporated in said right side part of said screen frame, said left side section of said screen being integrally incorporated with said diaphragm of said front-left channel woofer, said center section of said screen being integrally incorporated with said diaphragm of said front-center channel flat-type woofer and said right side section of said screen being integrally incorporated with said diaphragm of said front-right channel flat-type woofer.

2. A screen apparatus, comprising:
   a screen onto which images are to be projected;
   a screen frame surrounding and supporting said screen so as to allow said screen to oscillate independently of said screen frame, said screen frame having a left side part, center upper and lower parts, and a right side part;
   a group of speakers including at least one front-left channel tweeter, at least one front-center channel tweeter, at least one front-right channel tweeter and at least one woofer having a diaphragm, said front-left channel tweeter being incorporated in said left side part of said screen frame, said front-center channel tweeter being incorporated in one of said center upper and lower parts of said screen frame, said front-right channel tweeter being incorporated in said right side part of said screen frame, and said screen being integrally incorporated with said diaphragm of said woofer.

* * * * *